United States Patent [19]

Zito

[11] 3,982,033

[45] Sept. 21, 1976

[54] PROCESS FOR COATING PIZZA SHELLS WITH SAUCE

[75] Inventor: Santo Zito, Los Angeles, Calif.

[73] Assignee: Fairmont Foods Company, Culver City, Calif.

[22] Filed: Aug. 24, 1971

[21] Appl. No.: 174,394

Related U.S. Application Data

[63] Continuation-in-part of Ser. No. 880,880, Nov. 28, 1969, Pat. No. 3,631,818.

[52] U.S. Cl.................................. 426/302; 426/94
[51] Int. Cl.² ........................................... A23L 1/00
[58] Field of Search ................. 99/86, 92; 426/283, 426/302, 343, 345, 94

[56] References Cited
UNITED STATES PATENTS

| | | | |
|---|---|---|---|
| 1,663,719 | 3/1928 | Morley | 99/92 |
| 2,365,349 | 12/1944 | MacManus | 99/92 |
| 2,774,316 | 12/1956 | Daino | 99/86 UX |

*Primary Examiner*—Raymond N. Jones
*Attorney, Agent, or Firm*—Henry L. Brinks

[57] ABSTRACT

Pizza sauce is applied to pizza shells by a method in which the shells are held stationary and the sauce applied in a movement thereabove. The pizza shells are transmitted along a horizontal deck to a position at which the movement is interrupted for sufficient time to apply the pizza sauce to the pizza shells. A volumetric amount of pizza sauce is drawn from a supply source and furnished to distribution nozzles that rotate above the pizza shells. The distribution nozzles deposit the pizza sauce along the radii of the pizza shells while the distribution nozzles are rotated in a circle above the pizza shells.

5 Claims, 5 Drawing Figures

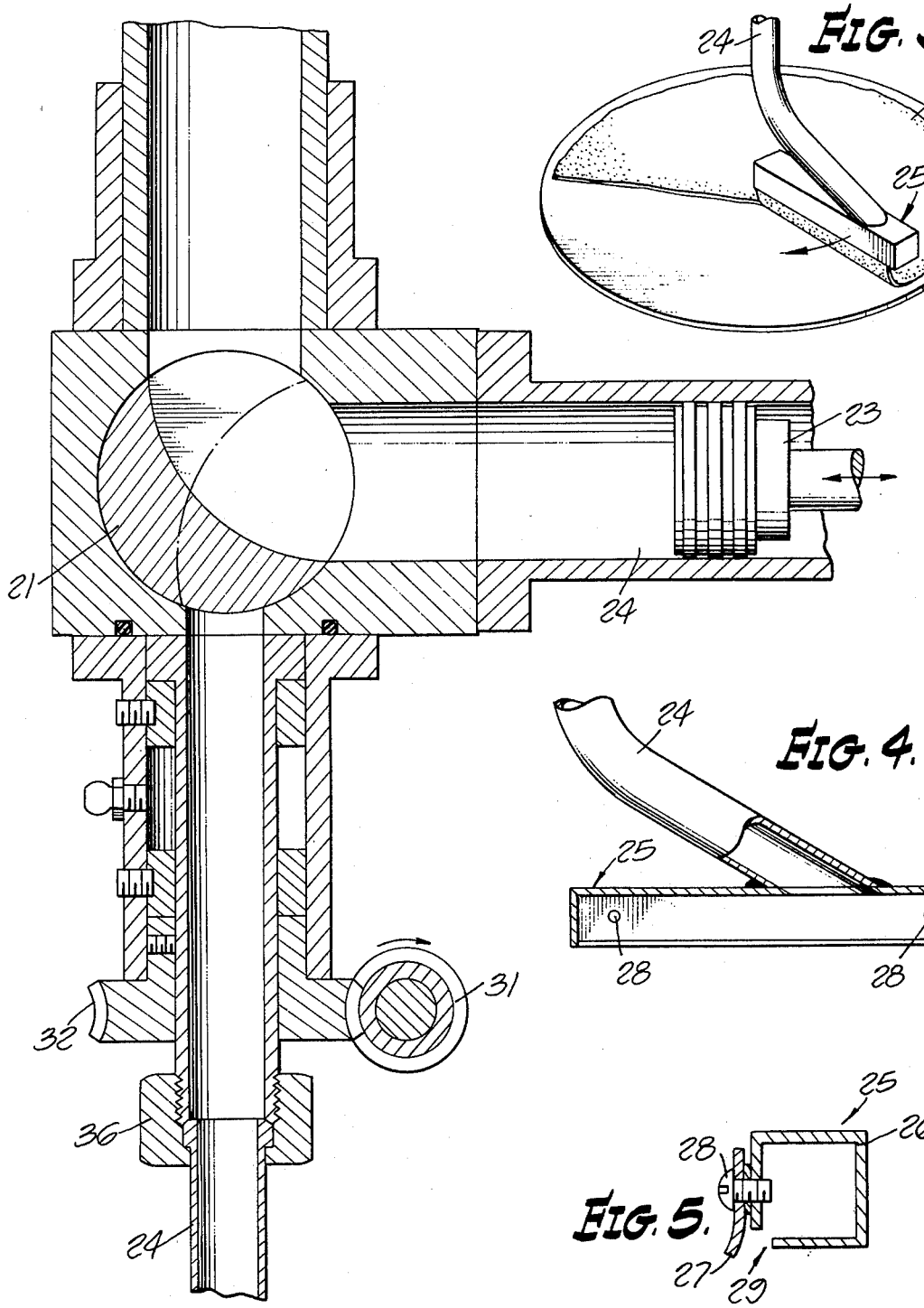

PROCESS FOR COATING PIZZA SHELLS WITH SAUCE

This is a continuation-in-part of application Ser. No. 880,880, filed November 28, 1969, for PIZZA SAUCE APPARATUS, now U.S. Pat. No. 3,631,818.

This invention relates to high speed food processing, and more specifically concerns a method for rapidly and effectively applying a pizza sauce material to a plurality of pizza shells or crusts.

BACKGROUND OF THE INVENTION

The need for improved high speed food processing has existed in the food processing industry for some time. This need is particularly evident in the processing presently used to make pizzas and to apply sauce to pizza shells or crusts. The methods presently used for applying tomato sauces and the like to pizza crusts in high speed food processing typically first index crusts under stationary sauce dispensing tubes, and then rotate the crusts as sauce is ejected through the tubes. Since the sauce dispensing tubes in such operations are normally quite small in diameter, the tubes tend to become easily plugged by seeds, tomato skins, and loose peels in the tomato sauce. As a result, paste-like sauces must be used. In addition, the equipment used to rotate the crusts is complex, operates at low processing speeds, and is not well suited for easy adjustment to accommodate different sizes of pizza crusts. Consequently, a less complex, more flexible and improved method for applying tomato sauce to pizza crusts has been desired for some time.

SUMMARY OF THE INVENTION

According to this invention, an improved method for applying tomato sauces to pizza crusts is provided for use in high-speed pizza making processes. One embodiment of this invention involves the rotation of rotatable pizza sauce dispensing nozzles to apply sauce to pizza crusts. These nozzles are made up of a hollow rotatable shaft and a radially extending head portion connected to the shaft and are adapted to discharge pizza sauce on crusts positioned below the radially extending head. A plurality of pizza crusts are intermittently transmitted along a flat horizontal deck; and the movement of the crusts is interrupted when pizza sauce is being applied from the nozzles. A supply of pizza sauce is positioned above the nozzles and is adapted to furnish pizza sauce to the rotating nozzles from a storage means. The supply of pizza sauce to the distribution nozzles is controlled. The rotation of the distribution nozzles is also controlled.

In other embodiments of this invention, a measured amount of pizza sauce is first drawn from the storage means and then discharged into the nozzles for eventual deposit on the pizza crusts below. In a first operation the supply means is connected with the piston assembly and a measured amount of sauce is drawn from the supply means by the action of the piston assembly, while in a second operation the piston assembly is connected with the distribution nozzles to discharge a measured amount of sauce into the distribution nozzles.

Finally, the presence of pizza crusts beneath the radially extending head portion of the nozzle controls the operation to cause the valve to connect the piston assembly with the distribution nozzles so that pizza sauce can be applied to the crusts.

The numerous advantages represented by this invention are apparent from an examination of the various components of the invention. The rotation of dispensing nozzles over stationary crusts permits the uniform application of sauce over the pizza crusts to within any desired distance of the outside edge of the crust. Thus, a mere adjustment in the rotational speed of the nozzles and the amount of sauce drawn from the supply means can add significant flexibility in the application of sauce to a variety of crusts. Moreover, the use of hollow shaft and radially extending head portion of the dispensing nozzles, rather than narrow tubes, permits the passage of seeds, peels, and other solids through the nozzles without obstruction of the sauce passages. The use of a valve actuated by a control assembly in the flat horizontal deck provides a "fail-safe" character to the apparatus of this invention, since sauce cannot be discharged to the nozzles unless a pizza crust is in a proper position beneath the nozzles to receive the sauce. Furthermore, it should also be apparent that the apparatus of this invention is extremely flexible in that nozzle sizes can be quickly changed to meet varying pizza sizes. The method can operate at high processing speeds without the necessity of manual labor.

BRIEF DESCRIPTION OF THE DRAWINGS

The invention will be better understood by reference to the drawings in which:

FIG. 2 is an exploded cross-sectional view of FIG. 1 and shows a portion of the piston assembly and a three-way valve which connects a supply hopper to the piston assembly and the piston assembly to the distribution nozzles;

FIG. 3 is a perspective view of one rotating distribution nozzle as it applies sauce to a stationary pizza crust;

FIG. 4 is a partial cross-sectional view of a distribution nozzle showing the hollow rotatable shaft secured to the radially extending head portion of the nozzle; and FIG. 5 is a cross-sectional view of FIG. 4 showing a cross section of the radially extending head portion of the distribution nozzle.

DESCRIPTION OF THE PREFERRED EMBODIMENTS

Figure 1:
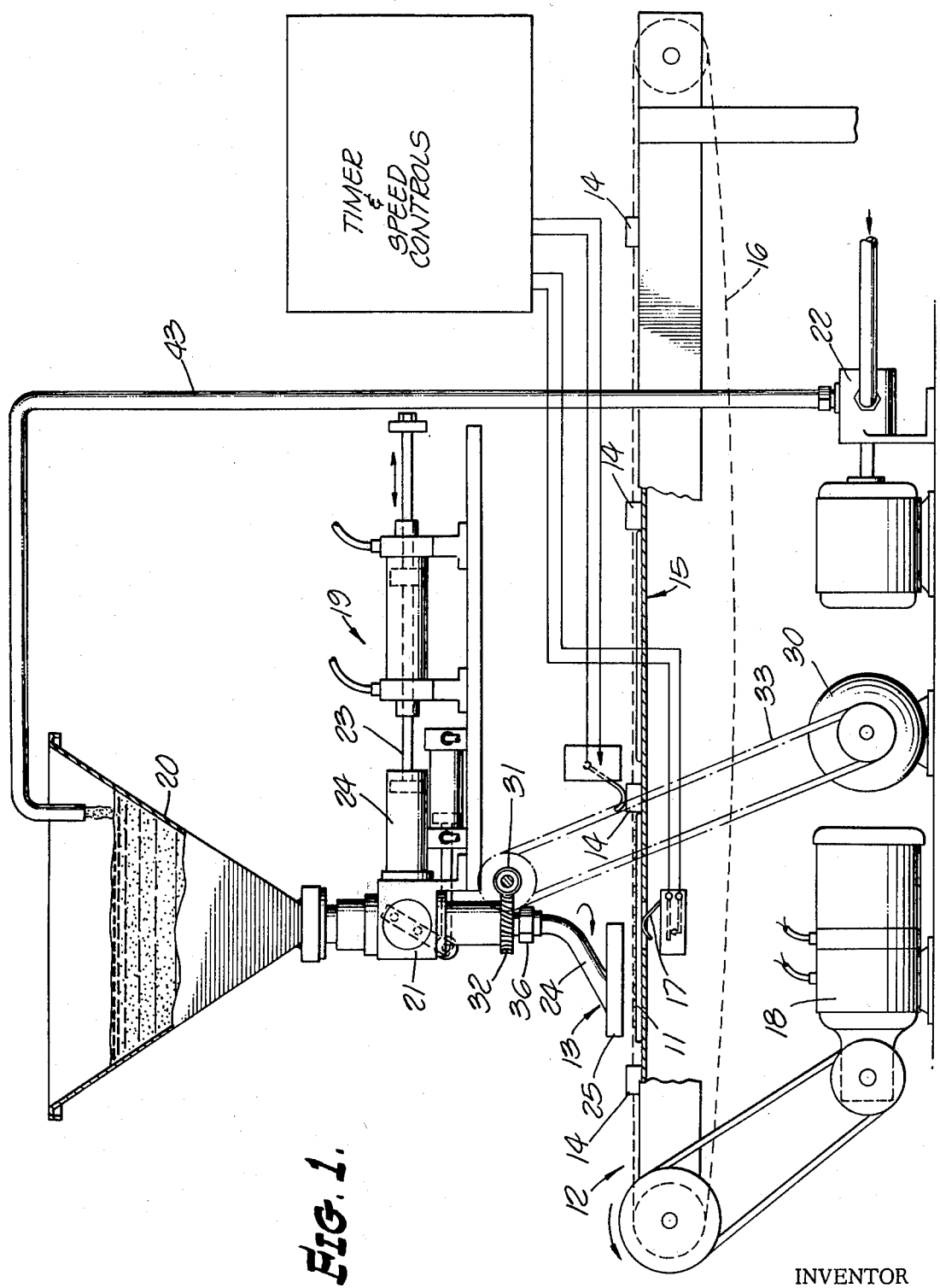
FIG. 1 is an end elevational view of one form of apparatus suitable for practicing this invention.

Referring now to the drawings, and particularly to FIG. 1, it can be seen that in operating the apparatus of this invention, pizza shells or crusts 11 are placed on a conveying assembly 12, which intermittently moves the crusts into positions beneath distribution nozzles 13. The conveying assembly 12 is preferably composed of a plurality of spaced transport bars 14, which lie across the flat horizontal bed in a position transverse to the direction of movement for the pizza crusts. Each end of transport bars is secured to a chain drive assembly 16, which is driven by motor 18 and serves to move transport bars 14 along bed assembly 15 in an intermittent or indexing fashion. Thus, after a series of pizza crusts are loaded along the lead edges of the spaced bars, they are moved into a position beneath distribution nozzles 13.

Since the pizza crusts must be exactly positioned under each of the distribution nozzles for the proper application of sauce to be effected, transport bars 14 are provided with a series of V-shaped indentations spaced along their lead edge. These indentations are sufficiently large to accommodate a circular pizza crust and hold it against lateral movement along the transport bar. The spacing of indentations in transport bars 14 correspond to the spacing between adjacent distribution nozzles 13. In this way, the pizza crusts tend to line up the indentations by gradually rolling laterally along the bar until they fall into the indentations where they are held in place until reaching the distribution nozzles.

As each crust 11 approaches a distribution nozzle 13, it passes over switch 17, which protrudes from the surface of bed assembly 15. When switch 17 is depressed, it indicates that crust 11 is in proper position below distribution nozzle 13. Consequently, a relay is actuated and pizza sauce is deposited from the distribution nozzle onto the crust. However, when switch 17 is not depressed, sauce will not be deposited from the distribution nozzle.

The actual discharge of pizza sauce from nozzle 13 involves the cooperation of piston assembly 19, overhead supply hopper 20 and three-way valve 21. Supply hopper 20 acts as a source of pizza sauce for piston assembly 19. Pump 22 is provided to feed fresh sauce from floor level through line 43 into the supply hopper. The action of pump 22 can be either manually controlled or a float switch in supply hopper 20 can be used to actuate pump 22 so that a constant supply of fresh sauce is always available for distribution.

Piston assembly 19 is provided to draw pizza sauce from the supply hopper 20 and then discharge the sauce through the distribution nozzles and onto the pizza crusts. In actual operation, the intake stroke of rod 23 draws a measured volumetric amount of sauce from the supply hopper into chamber 24. The amount of sauce drawn depends upon the length of the intake stroke of rod 23 and thus can be readily adjusted to suit various processing conditions. The reverse stroke of rod 23 causes the measured amount of sauce to be discharged into distribution nozzle 13 or back into supply hopper depending upon the position of valve 21.

FIG. 2 illustrates the three-way nature of valve 21. In one position the valve serves to connect supply hopper 20 with piston assembly 19. In its opposite position, valve 21 serves to connect piston assembly 19 with distribution nozzle 13. During the intake stroke of rod 23 the three-way valve is open to supply hopper 20. However, both the reverse stroke of rod 23 and the position of valve 21 are controlled by switch 17. When switch 17 is depressed, indicating that a pizza crust is properly indexed below nozzle 13 and in position for the application of sauce, then both valve 21 and rod 23 are activated so that valve 21 connects the piston assembly with the distribution nozzle and rod 23 makes its reverse stroke to discharge sauce into nozzle 13. However, when no crust is positioned below nozzle 13, then switch 17 is not depressed and the reverse stroke of rod 23 merely pumps the sauce back into the storage hopper.

Distribution nozzle 13 is constructed from a hollow shaft 24 and a radially extending head 25 secured to the shaft. As shown in FIGS. 4 and 5, the rectangular-shaped, radially extending, head 25 of nozzle 13 has body portion 26 secured to hollow shaft 24. The body 26 is partially closed by means of adjustable bracket 27 secured to one side of the body 26 by screw 28. Adjustment in the position of bracket 27 permits opening 29 in the lower end of radially extending head 25 to be adjusted to allow more or less sauce to flow through the distribution nozzle 13.

The distribution nozzle is rotated by means of motor assembly 30 which drives helical gears 31 and 32 through belt 33. The speed of rotation for the distribution nozzles can be easily controlled from 0 to 150 revolutions per minute. Thus, the evenness of the deposit of sauce is determined by the rotational speed of the radially extending head 25, the size of the opening 29 in the bottom of head 25 and the speed of the piston stroke of rod 23 which forces sauce through hollow shaft 24 and into the head.

Typically, radially extending head 25 is adapted to rotate in a circle which is substantially smaller in diameter than pizza crust positioned below. In this way, centrifugal force imparted to the sauce 34 by the revolution of head 25 causes the sauce to spread over an area greater in diameter than the circle defined by head 25. Thus, the pizza sauce 34 can be evenly applied within any distance from the outer edge of pizza crust 11 as shown in FIG. 3, by simply adjusting the rotational speed of head 25. In addition, it should be noted that the design of distribution nozzle 13 is such as to provide a greater flow of sauce at the outer edge of pizza crust 11 and a reduced flow at the center of the crust because of the centrifugal effect caused by rotating head 25 and because shaft 24 is positioned close to the outer end of head 25. Thus, an even distribution of sauce is accomplished rather than a conical deposit which could result from other distribution techniques.

It will also be noted in FIG. 3 that the pizza is deposited from the distribution nozzle head 35 in a line substantially along the radius of the pizza shell. As the nozzle is rotated in a circle, the pizza sauce 34 is deposited over the surface of the pizza shell.

It should be understood that preferred embodiments of this invention would have a number of distribution nozzles 13 aligned transverse to the direction of movement of the crusts. Typically, four such distribution nozzles are used together with a corresponding set of piston assemblies 19 and three-way valves 21. In this way, each transport bar 14 is adapted to carry four pizza crusts under the corresponding distribution nozzles 13.

Tests conducted on the preferred embodiment of this invention have shown that the total variation in the weight of pizza sauce applied to the crusts can be accurately controlled within a range of plus or minus two percent of a predetermined weight of sauce for each crust. In addition, it has been observed that by varying the speed of advance of transport bars 14 and the speed of rotation for radially extending heads 25 of the distribution nozzles, the processing speed of the apparatus of this invention can be varied between a range of 0 to 180 pizzas processed per minute. Moreover, the size of the pizza crusts processed and the rate at which sauce is applied can also be easily varied to various desired levels.

In order to adapt the invention to accommodate different sizes of pizza crusts, distribution nozzles 13 are merely removed by loosening coupling 36, and replacing the old nozzles with a new set of differently sized nozzles. After the new nozzles are inserted into position and secured by coupling 36, the indexing point for transport bars 14 is adjusted so that the pizza crusts will be properly centered below the new nozzles. If a change in the volume of sauce is desired, the size of opening 29 in horizontal head 25 is adjusted along with the speed of rotation of the distribution nozzles and the intake stroke of rod 23.

The invention is capable, therefore, of easy and quick adjustment for a variety of processing conditions. Moreover, the large size of the openings in the hollow shaft 24 and radially extending head 25 permit the passage of seeds and peels in the pizza sauce without obstructing the flow of sauce onto the pizza crusts.

I claim:

1. A method for applying pizza sauce material to a plurality of pizza shells, comprising the steps of:
   moving a plurality of pizza shells to a pizza sauce application position;
   interrupting the movement of said pizza shells after said pizza shells reach said application position for a time period during which pizza sauce material is applied to said pizza shells;
   measuring a volumetric quantity of pizza sauce material for application to the pizza shells;
   supplying the measured quantity of pizza sauce material to a plurality of distribution nozzles during said time period the pizza shells are in the application position;
   rotating the plurality of distribution nozzles over the pizza shells while the measured quantities of pizza sauce material are discharged therefrom; and
   discharging the pizza sauce material from said distribution nozzles in a path extending along at least a substantial portion of the radii of the pizza shells while said distribution nozzles are rotated in a circle above the pizza shells.

2. A method for applying pizza sauce material to a plurality of pizza shells, comprising the steps of:
   transmitting a plurality of pizza shells to a pizza sauce application position;
   interrupting the movement of said pizza shells after said pizza shells reach said application position for a time period during which pizza sauce material is applied to said pizza shells;
   measuring a volumetric quantity of pizza sauce material for application to said pizza shells;
   supplying the measured quantity of pizza sauce material to a plurality of rotatable distribution nozzles associated with each of said pizza shells;
   discharging the pizza sauce material in a swath from said nozzles extending over a substantial portion of the radii of said pizza shells; and
   rotating each of the distribution nozzles over each corresponding pizza shell while the measured quantity of pizza sauce material is supplied thereto so that the pizza sauce material is spread over the surface of the pizza shell as the pizza sauce material is discharged therefrom in said radial swath.

3. A method for applying pizza sauce material to a plurality of pizza shells comprising:
   transmitting a plurality of pizza shells as a group;
   interrupting the movement of said group of pizza shells at a position beneath a plurality of rotatable distribution nozzles during a time period at least sufficient for application of the pizza sauce thereto;
   drawing a measured volumetric amount of pizza sauce material from a storage means;
   discharging said measured volumetric amount of pizza sauce material upon the surface of said pizza shells during said time period of interrupted movement when said shells are positioned beneath said nozzles; and
   rotating said nozzles during the discharge of pizza sauce material therefrom.

4. A method for applying pizza sauce material to pizza shells comprising the steps of:
   measuring a volumetric amount of pizza sauce material to be applied to a pizza shell;
   supplying the measured volumetric amount of pizza sauce to a rotating, hollow shaft having a rotating, hollow, radially extending, distribution head attached thereto;
   depositing said measured volumetric amount on said pizza shell through at least one opening in the rotating distribution head which openings deposit the pizza sauce in a path along a substantial portion of the radius of the pizza shell so that the pizza sauce is deposited in a circle smaller than the diameter of pizza shell; and
   discharging the pizza sauce material from the openings in the rotating distribution head with sufficient speed so as to cause the pizza sauce to spread outwardly of the initial deposition circle on the pizza shell.

5. A method for applying tomato pizza sauce to stationary pizza shells, comprising:
   measuring a plurality of volumetric quantities of tomato pizza sauce material, each being sufficient to substantially coat the surface of a single pizza shell;
   supplying each measured volumetric quantity of tomato pizza sauce material to a hollow rotatable shaft in flow communication with a radially extending distribution head having one or more openings positioned above a pizza shell; and
   depositing the measured quantity of tomato pizza sauce material on all but the outermost edge of the pizza shell by feeding the pizza sauce material through the rotatable shaft and through the openings in said head across a path corresponding to at least a substantial portion of the radial extent of the pizza shell while said head is being rotated in a circle above the pizza shell.

* * * * *